(12) United States Patent
Lyman, Jr.

(10) Patent No.: US 7,082,694 B2
(45) Date of Patent: Aug. 1, 2006

(54) CENTER POINT LOCATOR DEVICE

(76) Inventor: Hugh Marion Lyman, Jr., 27639 SE. 401st St., Enumclaw, WA (US) 98022

( * ) Notice: Subject to any disclaimer, the term of this patent is extended or adjusted under 35 U.S.C. 154(b) by 0 days.

(21) Appl. No.: 11/323,642

(22) Filed: Jan. 3, 2006

(65) Prior Publication Data

US 2006/0130348 A1      Jun. 22, 2006

Related U.S. Application Data

(63) Continuation-in-part of application No. 11/083,757, filed on Mar. 21, 2005, now abandoned.

(60) Provisional application No. 60/522,849, filed on Nov. 12, 2004.

(51) Int. Cl.
*G01D 21/00* (2006.01)

(52) U.S. Cl. ............................ 33/670; 33/520; 33/644

(58) Field of Classification Search ................... 33/520, 33/644, 666, 670–676, 679
See application file for complete search history.

(56) References Cited

U.S. PATENT DOCUMENTS

| 1,373,367 | A | * | 3/1921 | Summers | 33/673 |
|---|---|---|---|---|---|
| 2,348,878 | A | * | 5/1944 | Behen | 33/672 |
| 3,345,755 | A | * | 10/1967 | Ferebee | 33/675 |
| 4,084,325 | A | * | 4/1978 | Jones, Jr. | 33/670 |
| 5,437,105 | A | * | 8/1995 | Work | 33/644 |
| 6,158,137 | A | * | 12/2000 | Bramlett | 33/520 |

* cited by examiner

*Primary Examiner*—Christopher W. Fulton

(57) ABSTRACT

Provided is a device that locates the center point of any one of a number of differently shaped objects in one manipulation. The device incorporates a bed plate and two opposing right angle sliding jaws to position a center punch or drill bit bushing to the center of the object.

22 Claims, 5 Drawing Sheets

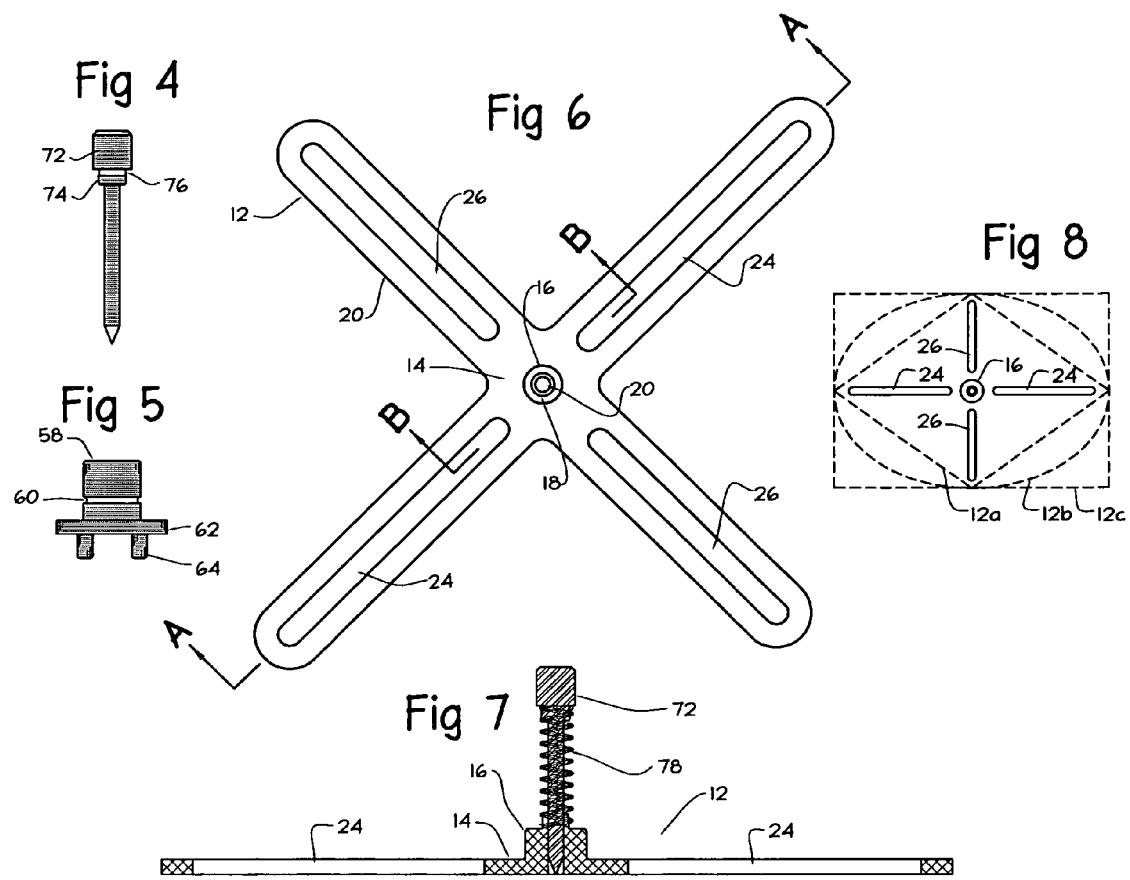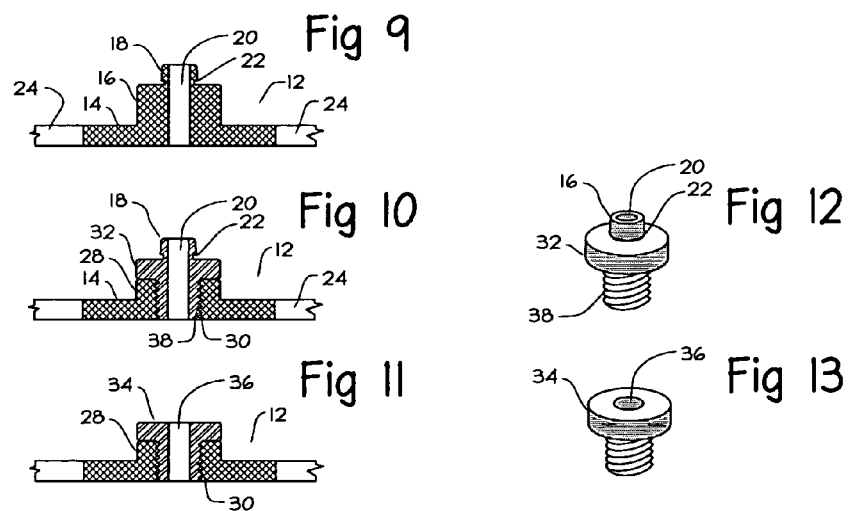

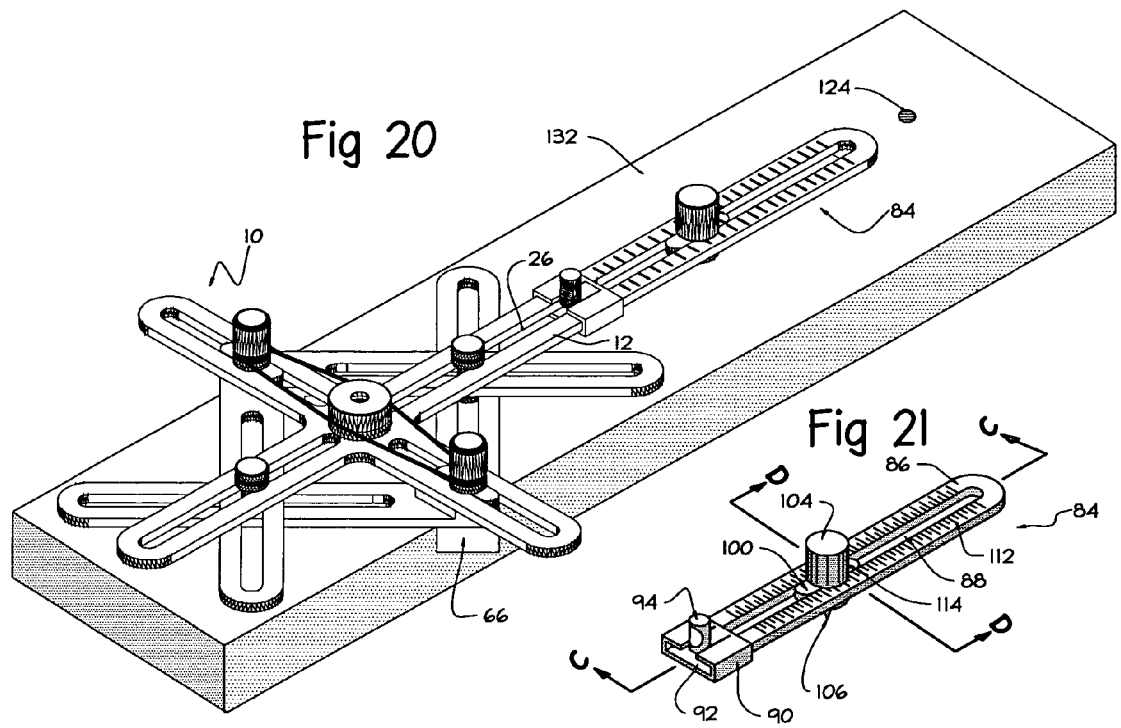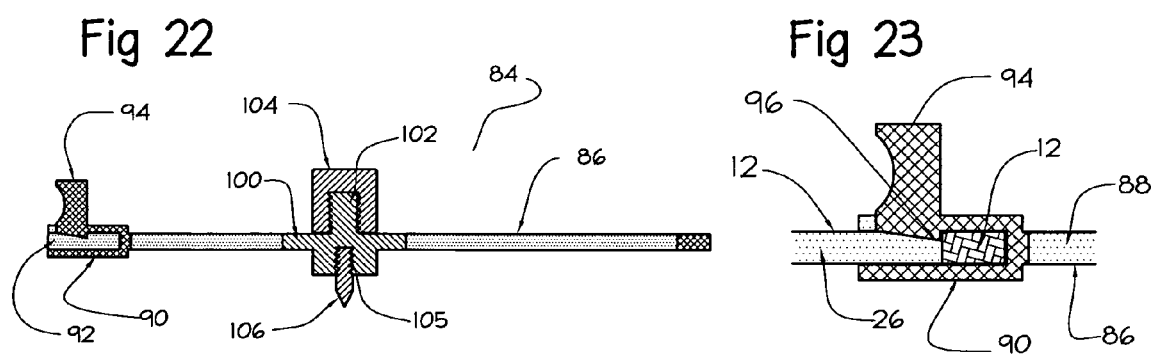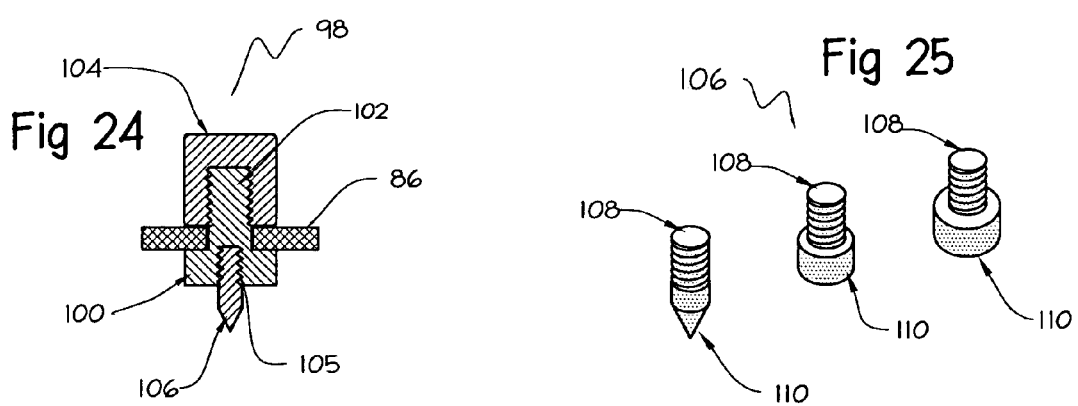

CENTER POINT LOCATOR DEVICE

RELATED APPLICATIONS

This patent application is a continuation-in-part application of U.S. patent application Ser. No. 11/083,757, filed Mar. 21, 2005 now abandoned, which is a continuation of U.S. provisional patent application Ser. No. 60/522,849, filed Nov. 12, 2004, for CENTER POINT MARKING DEVICE, by Hugh M. Lyman, Jr.

FIELD OF THE INVENTION

This invention relates to devices for locating the center on any one of a plurality of different shaped objects and, further, to a hand held center point locator device for making a mark and centering a drill bit bushing at the center of square, cylindrical, rectangular, octagonal, hexagonal and other regular polygon objects with an even number of sides.

BACKGROUND OF THE INVENTION

Locating, marking and drilling at the center point of different shaped objects is a common practice in the woodworking and metalworking industries and is performed by lathe operators, carpenters, tool makers, hobbyists and other technicians.

A lathe operator marks the center at both ends of a billet to properly position the billet in a lathe. A carpenter locates the center at the end of a 4×4 wood column and drills a hole for receiving a stud or bolt. The hobbyist needs to mark the center at the end of a small diameter dowel to drill a hole through the dowel.

Traditionally locating and marking the center point on objects has been by positioning a center square or straight edge device on the object and making pencil lines or scribe marks at right angles as shown in U.S. Pat. No. 477,959 issued to Price and U.S. Pat. No. 1,157,589 issued to Savage, the center being the intersection of the lines drawn. Other devices have been developed as shown in U.S. Pat. No. 49,553 to Safford et al; U.S. Pat. No. 311,619 to Varnum; U.S. Pat. No. 316,918 to Standeford; U.S. Pat. No. 335,846 to Singer; U.S. Pat. No. 352,693 to Irving; U.S. Pat. No. 364,082 to Bell; U.S. Pat. No. 390,658 to Gage; U.S. Pat. No. 578,196 to Beck; U.S. Pat. No. 597,915 to Roosa; U.S. Pat. No. 787,893 to Christoph; U.S. Pat. No. 834,973 to Fisk; U.S. Pat. No. 906,180 to Wrightsman; U.S. Pat. No. 912,052 to Albertson; U.S. Pat. No. 986,405 to Oneal; U.S. Pat. No. 1,067,877 to Needham; U.S. Pat. No. 1,187,658 to Sauerhering; U.S. Pat. No. 1,274,647 to Whipple; U.S. Pat. No. 1,280,379 to Bonney; U.S. Pat. No. 1,286,748 to Ozerowicz; U.S. Pat. No. 1,386,152 to Brigham; U.S. Pat. No. 1,543,093 to Bickl U.S. Pat. No. 2,413,768 to Hyde; U.S. Pat. No. 2,559,280 to Cochran; U.S. Pat. No. 2,479,912 to Desy; U.S. Pat. No. 2,599,819 to Fisher; U.S. Pat. No. 2,816,366 to Barlow; U.S. Pat. No. 4,326,339 to Marino; U.S. Pat. No. 4,667,549 to Griffin; and U.S. Pat. No. 4,868,995 to Lee.

Many of the techniques used by these devices comprise complicated mechanisms and require multiple and often awkward manipulations including but not limited to measuring, layout and setup. Review of prior art clearly portrays the use of gears, rack and pinions, set screws, ruler lines, turn handles, threaded rods and other mechanisms. U.S. Pat. No. 4,868,995 discloses a simple device, but it requires being mounted to a wall and is basically only for wood parts that fit into a lathe. It is not suitable for marking small parts which are shorter in length than orthogonal plates. It would be difficult if not impossible to mark the end of a 4×4 wood column that is 8 feet long. The patent notes when it refers to rectangular objects that it can " . . . assist in locating the center . . . " and the object is " . . . slightly rectangular . . . ".

The U.S. Pat. No. 316,918 to Standeford describes a device having more latitude. It will find the center of a rectangular object, although again, it requires many manipulations with the use of set screws.

U.S. Pat. No. 4,326,339 issued to Marino describes an invention that requires awkward manipulations with pulley and rack and pinion systems. This invention notes a "center point marker" but locates the center line of an object from only two ends, not a center point equal distance from all perimeter edges of the object; and further, it has no element for making a mark.

Although U.S. Pat. No. 568,196 issued to Beck illustrates a jaw method in the form of a cross, it requires a rack and pinion system for moving the jaws and does not address marking the center of a rectangular object.

U.S. Pat. No. 4,084,325 issued to Jones Jr. locates the center of objects; however, it requires several awkward manipulations using set screws.

U.S. Pat. No. 2,348,878 to Summers locates the center of objects requiring many awkward manipulations using set screws and scale graduations.

U.S. Pat. No. 2,348,878 issued to Behen locates the center of a shaft and also requires sets screws bolts and has a loose bushing mounted in slots.

U.S. Pat. No. 5,437,105 issued to Work locates only a parallel line center from two parallel edges of an object.

U.S. Pat. No. 6,158,137 issued to Bramlett is a complicated mechanism with multiple elements using gears and scale graduations.

U.S. Pat. No. 3,345,755 issued to Ferebee employs racks and gears and is complicated to the point of being commercially unfeasible.

Heretofore, prior art fails to address a device that simply clamps to the object in one manipulation to locate the center thereof.

It is therefore an object of the invention to provide a simple device for locating the center of square, round, octagonal, hexagon, rectangular and other regular polygon objects with an even number of sides.

It is another object of the invention to provide a plurality of means for moving a center punch to the center of an object.

It is another object of the invention to provide a center point locator device that centers a drill bushing to an object, to guide a drill bit for drilling a hole.

It is another object of the invention to provide a center point locator device that clamps to the object.

It is another object of the invention to provide a center point locator device that has a center punch for marking the center of an object.

It is further object of the invention to provide a spring to hold and return the center punch to the neutral position.

It is another object of the invention to provide control means for moving sliding jaws together.

It is another object of the invention to provide means for guiding sliding jaws to the center.

It is another object of the invention to provide slot apertures in the jaws and the bed plate to maintain alignment.

It is another object of the invention to provide a center point locator device that locates the center of a rectangular part.

It is another object of the invention to provide a center point locator device that locates the center of a hexagon shaped part.

It is another object of the invention to provide a hand held center point locator device.

It is another object of the invention to provide a portable center point locator device.

It is another object of the invention to provide a center point locator device that does not require calibrated measuring lines.

It is another object of the invention to provide a center point locator device that does not require lock screws, gears, rack and pinions and crank handles.

It is another object of the invention to provide a center point locator device that is light weight.

It is another object of the invention to provide a center point locator device that is inexpensive to fabricate.

It is another object of the invention to provide a center point locator device that can be fabricated in different sizes.

SUMMARY OF THE INVENTION

In accordance with the present invention, there is provided a device that locates the center point of any one of a plurality of different objects that are square, cylindrical, octagonal, hexagonal and other regular polygon objects with an even number of sides. The device includes a bed plate, two opposing right angle shaped sliding jaws each with arms at right angles, all coupled with axle pin assemblies through slot apertures. The device includes a spring loaded center punch mounted in the bed plate, optional drill bit bushings, two rotating jaws for clamping rectangular objects in position, two control handles for operating the sliding jaws and a resilient band attached to the control handles to urge the jaws toward each other. The device requires only one operation to find the center point of an object. The device is simple, light in weight, and inexpensive to manufacture, eliminating measuring, manipulations, setup and pencil line errors associated with traditional methods for locating the center of objects.

BRIEF DESCRIPTION OF THE DRAWINGS

A complete understanding of the present invention may be obtained by reference to the accompanying drawings, when considered in conjunction with the subsequent, detailed description, in which:

FIG. 4 is a front view of a center punch;

FIG. 5 is a front view of a control handle;

FIG. 6 is a top view of a bed plate of this invention;

FIG. 7 is a cross sectional view of a bed plate of this invention taken along lines A—A of FIG. 6 with a spring encompassing the center punch;

FIG. 8 is a dotted outline view of geometric shapes from which the bed plate can be formed;

FIG. 9 is a cross sectional view of a center bushing, housing for the center punch taken along lines B—B of FIG. 6;

FIG. 10 is an enlarged cross sectional view of a center bushing boss, housing a removable center bushing;

FIG. 11 is an enlarged cross sectional view of a center bushing boss, housing a removable drill bit bushing;

FIG. 12 is a perspective view of the removable center bushing;

FIG. 13 is a perspective view of the removable drill bit bushing;

FIG. 20 is a perspective top view of the invention with an optional extension arm attached to one arm of the device;

FIG. 21 is a perspective view of the optional extension arm shown is FIG. 20;

FIG. 22 is a cross sectional view of the optional extension arm of FIGS. 20 and 21 taken through lines C—C of FIG. 21;

FIG. 23 is an enlarged cross sectional view of the extension arm nacelle shown in FIG. 22;

FIG. 24 is an enlarged cross sectional view of the optional extension arm taken through lines D—D of FIG. 21; and FIG. 25 is a perspective view of alternate embodiment sized pins used with the optional gauge pin assembly;

For purposes of clarity and brevity, like elements and components will bear the same designations and numbering throughout the FIGURES. For purposes of brevity the 'center point locator device' will be referred to as 'device'.

Figure 1:
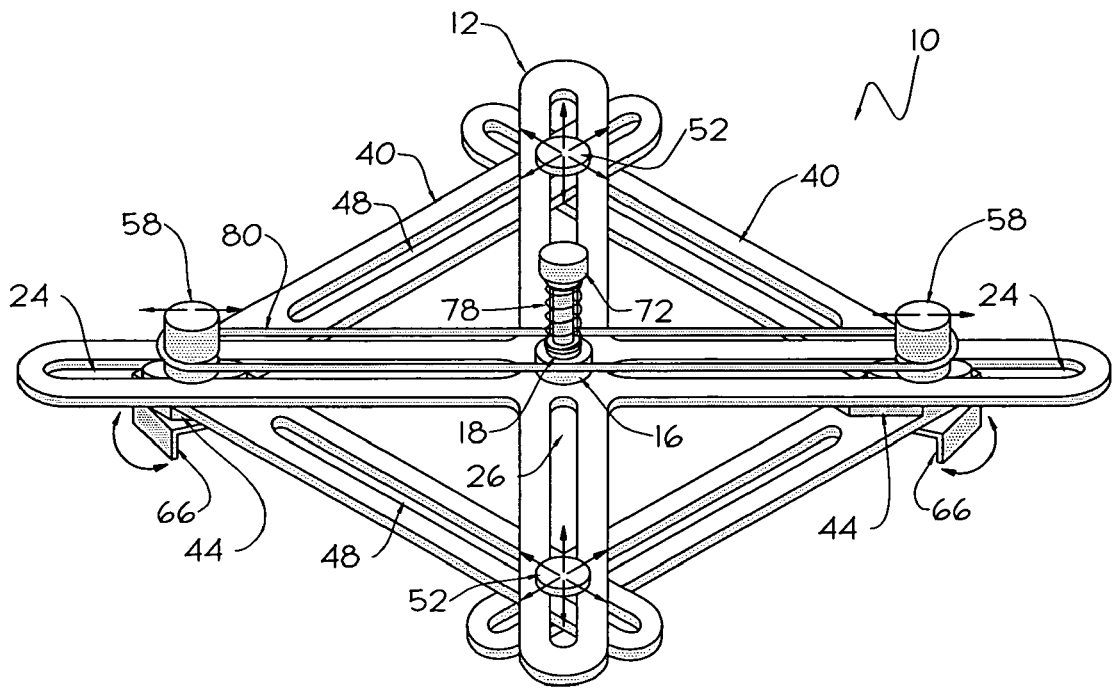
FIG. 1 is a perspective top view of a center point locator device in accordance with this invention.

The following reference numerals are used to indicate the parts and environment of the inventions:

10 device
12 bed plate
12a bed plate option
12b bed plate option
12c bed plate option
14 bed plate apex
16 center bushing boss
18 center bushing neck
20 shaft hole
22 center bushing neck groove
24 horizontal slot aperture
26 vertical slot aperture
28 alternate center bushing boss
30 tapped center bushing hole
32 center punch bushing
34 drill bit bushing
36 drill bit bushing hole
38 male threaded stud
40 sliding jaw
42 sliding jaw apex
44 offset block
46 rivet hole
47 inside edges
48 slot aperture
50 stud hole
52 axle pin assembly
54 female axle pin
56 male axle pin
58 control handle
60 control handle groove 62 elongated guide
64 elongated guide stud
65 orthogonal plates
66 right angle rotating jaw
67 rotating jaw attachment
68 rotating jaw hole
70 eyelet rivet
72 center punch
74 center punch neck
76 center punch neck groove
78 spring
80 resilient band
82 alternate center point locator device
83 extended bed plate arm
84 extension arm assembly
86 extension arm
88 extension arm slot aperture
90 extension arm nacelle
92 nacelle cavity
94 key sear
96 key sear dog
98 gauge pin assembly
100 gauge pin base
102 gauge pin stud
104 gauge pin knob
105 tapped aperture hole
106 gauge pin
108 pin stud
110 pin base
112 scale graduations
114 alignment mark
116 hand
118 drill motor
140 drill bit
122 mallet
124 hole
126 cylindrical object
128 square object
130 rectangular object
132 long rectangular object

DESCRIPTION OF THE PREFERRED EMBODIMENT

This present device is used to find the center of a plurality of objects with one manipulation, and then mark and/or drill a hole at the center point, as herein described.

Referring to FIG. 1, which is a perspective top view of the device 10 in accordance with the invention, a bed plate 12, two sliding jaws 40, two elongated guides 62, two control handles 58, two axle pin assemblies 52, two rotating jaws 66, a center punch 72, a spring 78, and a resilient band 80 are provided. This view illustrates the assembled relational position of the elements. The two identical right angle sliding jaws 40 traverse equally to and from the center of the bed plate 12, thereby centering a center bushing boss 16 on an object, this accomplished in one manipulation. The device 10 can center the center bushing boss 16 to a cylindrical, rectangular, octagonal, hexagon and other regular polygon objects with an even number of sides. The center bushing boss 16 is illustrated integral with the bed plate 12 as shown in FIG. 9.

Another embodiment of the center bushing boss is illustrated in FIGS. 10 and 11, wherein a removable center punch bushing 32 can be replaced with a removable drill bit bushing 34. The device elements may be fabricated from any suitable material such as metal, wood and molded thermoplastic resin.

The bed plate 12 which provides a stationary platform, can be of any geometric shape, some of which are illustrated in FIG. 8, having four slot apertures 24 and 26 in the shape of a cross, (noted for differentiation as two horizontal 24 and two vertical 26), positioned at ninety degree angles in relation to each other. The slot apertures 24 and 26 are disposed from near the outer boundaries of the bed plate 12 and terminate near and spaced apart from the center of the bed plate 12, forming an apex 14 thereof, thus providing two horizontal slot apertures 24 and two vertical slot apertures 26.

Each sliding jaw 40, joined at the sliding jaw apex 42, at ninety degree right angles, planular aligned, with slot apertures 48 disposed in each arm and terminating near the sliding jaw apex 42. The two sliding jaws 40 are mated face to face and mirrored opposite to each other with arms overlapping and traversely connected to the bottom face of the bed plate 12 through relative slot apertures 48 of the sliding jaws 40 and slot apertures 26 of the bed plate 12, with axle pin assemblies 52. Elongated guides 62 are rigidly attached at the sliding jaw apex 42 at a forty five degree angle to the right angle arms of the sliding jaws 40, and project through the horizontal slot apertures 24 of the bed plate 12, thereby restricting the sliding jaws 40 from rotation.

The axle pin assemblies 52 maintain a relationship between the two sliding jaws 40 aligning them so that they are always equal distance from the center bushing boss 16 of the bed plate 12, as they transverse toward or away from the center of bed plate 12.

A center punch 72 is freely housed in a center bushing boss 16, which is attached either rigidly or removably to the top of bed plate 12 at its apex.

Figure 14:
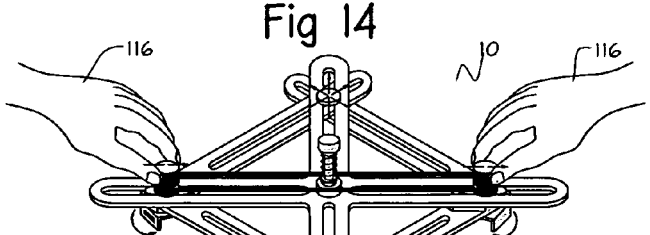
FIG. 14 is a perspective top view of the center point locator device held by a use.

Control handles 58 are attached to the elongated guides 62 to assist in moving the sliding jaws 40 and providing a means for attaching a resilinet band 80. The resilient band 80 is replaceably attached to the control handles 58. The sliding jaws 40 are expanded by the control handles 58 with two hands 116 to position the device 10 on an object such as the cylindrical object 126 as shown in FIG. 14. The resilient band 80 connected to the control handles 58 urges the sliding jaws 40 together clamping the device to the object for marking or drilling a hole.

Figure 2:
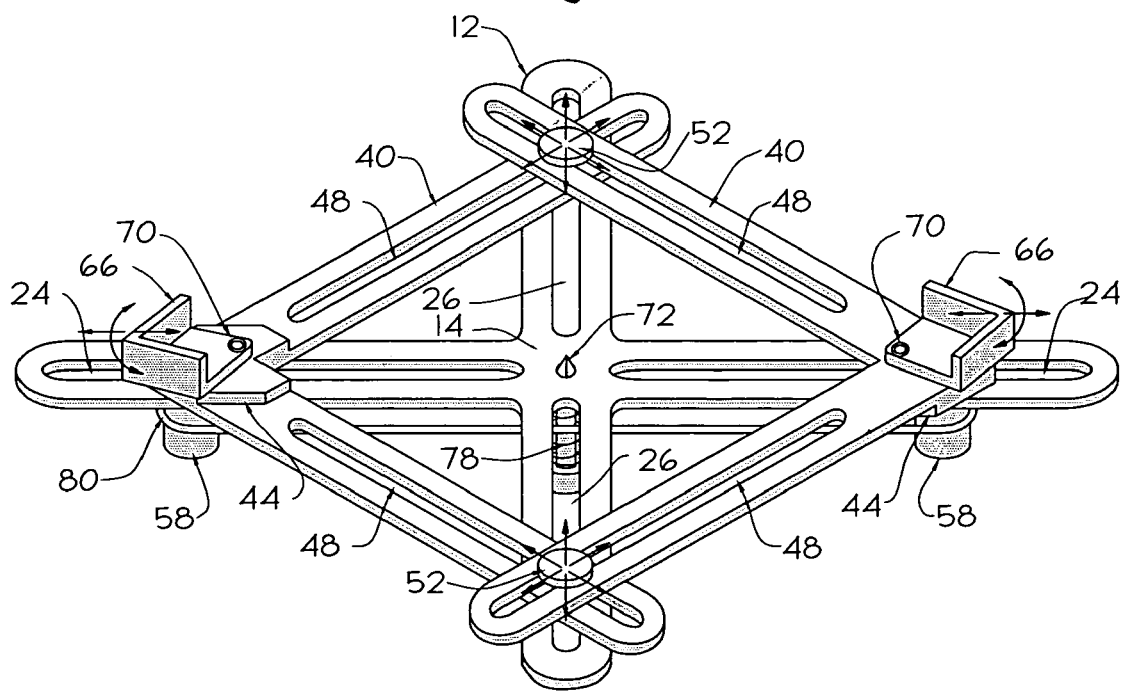
FIG. 2 is a perspective bottom view of the inventive center point locator device.

Referring to FIG. 2, a perspective bottom view of the device, illustrating more clearly the position of the rotating jaws 66, the sliding jaws 40 and the center punch 72. The rotating jaws 66 are designed for clamping a rectangular object 130 in position for marking or drilling and are rotationally attached to the sliding jaws 40. The rotating jaws 66 rotate in the same direction when a rectangular object 130 is place between the apexes of the rotating jaws 66 as the sliding jaws 40 are urged together by the resilient band 80 to hold the object. The degree of rotation of the rotating jaws 66 being equal, centers the rectangular object 130 to the center position of the center bushing boss 16 mounted in the bed plate 12.

Figure 3:
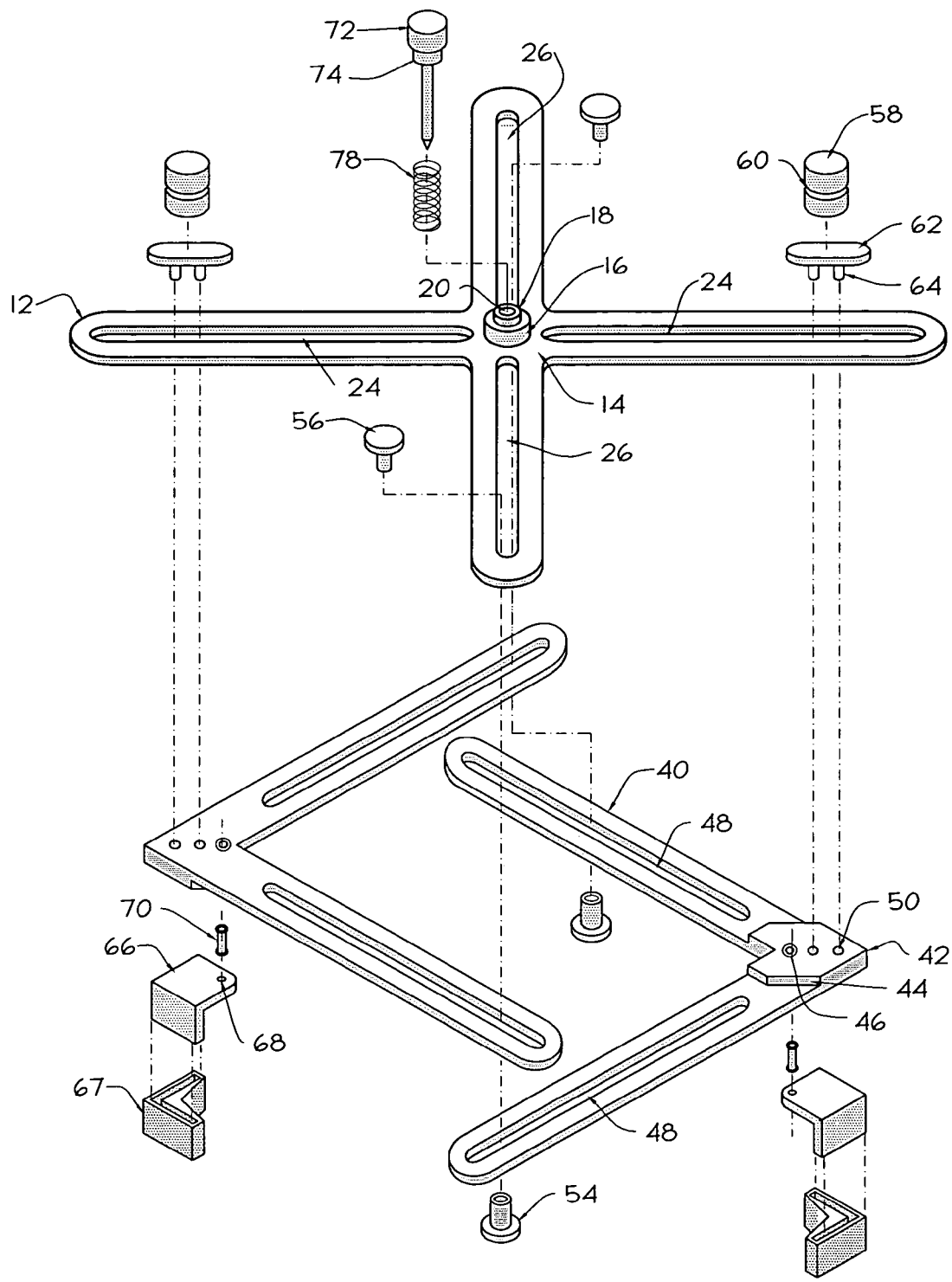
FIG. 3 is an exploded view of the inventive center point locator device.

For centering a hexagonal shape object a slip on attachment 67 is provided (as illustrated in FIG. 3). These rotating jaw attachments 67 are slipped over the orthogonal side plates 65 on the rotating jaws 66. This changes the angle of rotating jaws orthogonal side plates 65 from 90 degrees to 120 degrees. The corner angles of a hexagon shape are 120 degrees, therefore the hexagon corners fit to the corners of rotating jaw attachments. For other shaped objects with an even numbered sides and different angled corners, different rotating jaw attachments 67 of varying angles can be provided.

Referring to FIG. 3, an exploded view of the device, further illustrating the assembly of the elements and their relationship with relative slots in the bed plate 12 and sliding jaws 40. Each of the sliding jaws 40 have a jaw offset block 44 rigidly attached at the sliding jaw apex 42 of the sliding jaw arms, thus when the sliding jaws 40 are mirror mated with like faces to each other, a planular horizontal alignment of the sliding jaws 40 and the rotating jaws 66 is accomplished. Also illustrated are the rivet holes 46 in the sliding jaws 40 and rotating jaws 66 which receive eyelet rivets 70 for attaching the two rotating jaws 66 in longitudinal alignment with the center bushing boss 16. One rotating jaw 66 is mated rotatably with eyelet rivet 70 to the face of the left sliding jaw offset block 44, at its apex 42, through rivet hole 46 and rotating jaw hole 68. The second rotating jaw 66 is mated rotatably with eyelet rivet 70 to the opposite face of the right sliding jaw 40 at its apex 42.

Each rotating jaw 66 is formed from two orthogonal plates at 90 degrees, with a third providing a base. Male axle pin 56 and female axle pin 54 are mating elements of the axle pin assemblies 52 which are assembled through vertical slot apertures 26 of the bed plate 12 and slot apertures 48 of the sliding jaws 40 as illustrated by dashed connection lines. The control handles 40 have a diameter larger than the width of the horizontal slot apertures 24 in the bed plate 12, wherein when attached to the elongated guides 62 they transversely secure the sliding jaws 40 at sliding jaw apex 42 to the bed plate 12. The elongated guides 62 are thicker than the thickness of the bed plate 12, wherein, when the control handles 58 are attached to the elongated guides 62, the elongated guides are free to move within the slot apertures 24 of the bed plate 12. The design of the elements as illustrated in FIG. 3, are as such to facilitate the assembly of the device 10 if constructed of molded thermoplastic resin.

FIG. 4 is a front view of a center punch 72, illustrating one means for holding and securing the spring 78 to the center punch 72. The center punch neck 74 has a center punch neck groove 76 which secures the spring 78 removably to the center punch 72. The center punch neck 74 is tapered to facilitate the attachment of the spring 78.

FIG. 5 is a front view illustrating one design of the control handles 58 with a cylindrical head and an elongated base 62, a band groove 60 for holding the resilient band 80 and the handle studs 64 which rigidly fit into the handle receiving holes 50 in the sliding jaws 40. Apparent to anyone ordinarily skilled in the art are other shaped control handles 58 that would serve the same purpose and scope. Also evident is the handle studs 64 are only one means of rigidly attaching the control handle 60 to the sliding jaws 40. The elongate base 62 of the control handles 58 that are rigidly attached to the sliding jaws 40 restrict the sliding jaws 40 from rotating in the vertical slot apertures 24 that they traversely slide in.

FIG. 6 is a top view of the bed plate 12 with section lines A—A and B—B. Section B—B shows the bed plate apex 14, where the center bushing boss 16 is rigidly affixed at the center apex of the bed plate 12. The bed plate 12 can be of any geometric shape as illustrated in FIG. 8, such as, but not limited to a diamond shape 12a, oval shape 12b, rectangle or square shape 12c, with four slots disposed at 90 degrees in the form of a cross terminating to form a bed plate apex 14 at the center of the four slots, wherein attached, centered between the horizontal slot apertures 24 and the vertical slot apertures 26, is the center bushing boss 16.

FIG. 7 is a cross sectional view taken along lines A—A of the bed plate 12 illustrating one end of the spring 78 encompassing the center punch neck 74 of the center punch 72 and the other end connected to the center bushing neck 18 of the center bushing boss 16. The spring 78 and center punch 72 can be removed for maintenance or replacement.

FIG. 9 is an enlarged sectional view taken along lines B—B shown in FIG. 6. The center bushing boss 16 is attached to the bed plate 12 for freely housing the center punch 72. The shaft hole 20 extends through the center bushing boss 16 and the bed plate 12. A center bushing neck 18 is integrally attached to the center bushing boss 16. The center bushing neck groove 22 in the center bushing neck 18 removably secures a spring 78 to the center bushing boss 16. The center bushing neck 18 is tapered to facilitate the attachment of the spring 78.

FIG. 10 is a cross sectional view of an alternate center bushing boss 28, in place of the center bushing boss 16 (FIG. 9), wherein provided is a tapped center bushing hole 30 for receiving the male threaded stud 38 of the threaded removable center punch bushing 32.

FIG. 11 is a cross sectional view of the alternate center bushing boss 28, wherein provided is a removable drill bit bushing 34 in lieu of the removable center punch bushing 32. Multiple threaded removable drill bit bushings 34 can be furnished with different diameter bushing holes 36.

FIGS. 12 and 13 are perspective views of the exchangeable removable center punch bushing 32 and the removable drill bit bushing 34, respectively, illustrating the male threaded stud 38.

FIG. 14 is a perspective top view of the device 10 as held by two hands 116. By expanding the control handles 40 apart the device is positioned on the object such as a cylindrical object 126.

Figure 15:
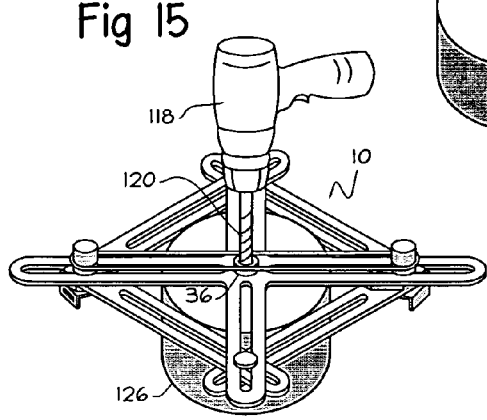
FIG. 15 is a perspective top view of a drill with drill bit in position for drilling a hole.

FIG. 15 is a perspective top view of the device 10 positioned to a cylindrical object, with a drill motor 118 and drill bit 120 in position for drilling a hole in the object.

Figure 16:
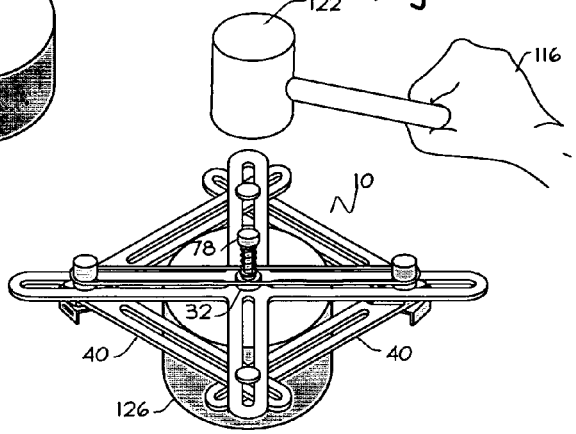
FIG. 16 is a perspective top view of a center point marker with user striking the center punch with a mallet.

FIG. 16 is a perspective top view of the device 10 with a cylindrical object clamped in position and illustrating the hand 116 and the mallet 122 ready to depress the center punch 72. The cylindrical object 126 is held between the two sliding jaws 40 at the inside edges 47 of the sliding jaws 40. Once the object is centered it takes one step to make a center point mark by depressing the center punch 72 with a mallet 122, or other striking device. In some cases if the material is soft, such as balsa wood, the center punch 72 can be depressed by hand.

Figure 17:
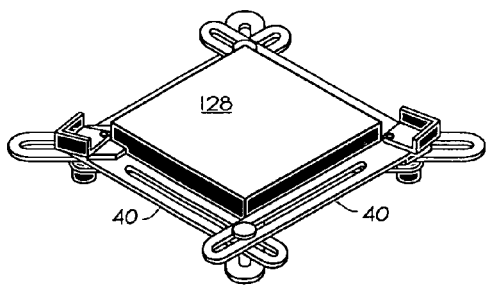
FIG. 17 is a perspective bottom view of a square shaped object in position for marking or drilling.

FIG. 17 is a perspective bottom view of a device 10 with a square object 128 in position for marking or drilling. The square object 128 is held between the arms of the opposing sliding jaws 40.

Figure 18:
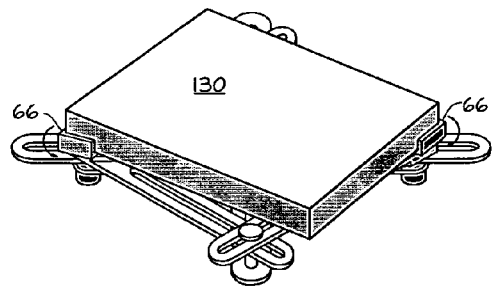
FIG. 18 is a perspective bottom view of a rectangular shaped object in position for marking or drilling.

FIG. 18 is a perspective bottom view of the device 10 with a rectangular object 130 in position. The rotating jaws 66 holds the rectangular object 130 at its diagonal corners centering the center bushing.

Figure 19:
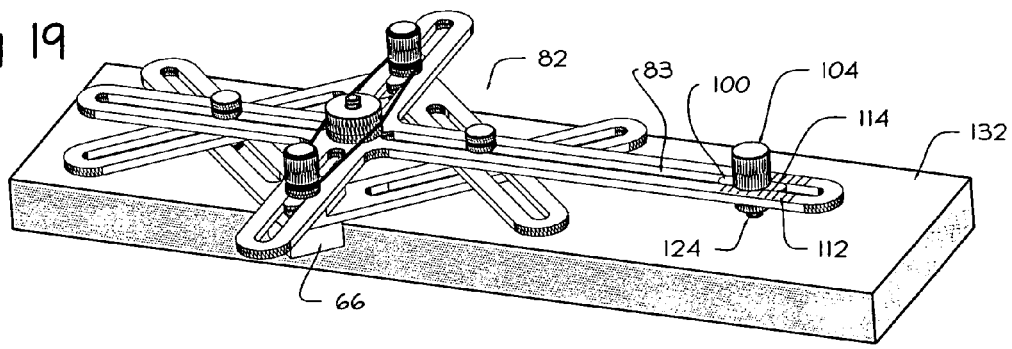
FIG. 19 is a perspective top view of the center point marker device, with one arm extended.

FIG. 19 is a perspective top view of an alternate center point locator device 82, wherein one vertical arm slot aperture 26 is extended in length and provided with an adjustable gauge pin assembly 98 and scale graduations 112 embossed on the face of the extended arm. This embodiment is for marking or drilling progressive holes on the face of a long rectangular object 132 at a predetermined distance.

FIG. 20 is a perspective top view of an optional extension arm assembly 84, which is removably attached to an arm vertical slot 26 of the device 10, and is shown in position on a long rectangular object 132.

FIG. 21 illustrates the extension arm 84 attached to the device 10 by means of an extension arm nacelle 90 at one end of the extension arm 86. The extension arm nacelle 90 has a nacelle cavity 92, as shown in FIGS. 21 and 22, in which the arm of the center point locator fits into and is held there by a flexible key sear 94, locking to the arm of the center point locator 10 into its vertical slot aperture 26. The key sear 94 has a tapered key sear dog 96 that flexes as the extension arm 84 slides onto the center point locator arm, thereby automatically locking it in position. By flexing the key sear 94 up, the extension arm 84 can be released for removal.

The extension arm assembly 84 is provided with a gauge pin assembly 98 and scale graduations 112 embossed on the face of the extension arm 86, wherein the adjustment of the gauge pin assembly 98 in the extension arm slot aperture 88 is indexed to a determined distance for marking or drilling holes 124 in the face of a long rectangular object 126. An alignment mark 114 is provided on the face of the elongated portion of the gauge pin base 100 for aligning to the scale graduations 112 on the extension arm 86.

The center point locator is placed on the face of a rectangular object 126, such as a 2×4 piece of lumber, wherein the removable drill bit bushing 34 is centered between the parallel edges of the 2×4 by means of the rotating jaws 66. After a hole 124 is drilled in the 2×4, the device is moved and the gauge pin 106 of the gauge pin assembly 98 is placed in the first drilled hole 124 and the drill bit bushing 34 is again centered to the face of the 2×4 with the rotating jaws 66. A second hole, and progressive holes or marks can thereby be made, all being centered at the face of the object and equally spaced.

FIG. 22 is a cross sectional view, taken along line C—C of FIG. 21. The extension arm assembly 84 shows a threaded gauge pin stud 102 to accept the gauge pin knob 104 and a tapped aperture hole 105 to receive the threaded pin studs 108 of gauge pins 106. The thickness of the elongated section of the gauge pin base 100 is thinner than the thickness of the extension arm 86, thereby facilitating the clamping of the gauge pin assembly 98 to the extension arm 86 when the gauge pin knob 104 is tightened.

FIG. 23 is a enlarged cross sectional view of the key sear 94 showing the arm end of the center point locator 12 locked in the slot 26 by the tapered key sear dog 96.

FIG. 24 is a enlarged cross sectional view taken along line D—D in FIG. 21. The lower portion of the gauge pin base 100 is wider than the slot aperture 88 in the extension arm 86, so when the gauge pin knob 104 is tightened, it clamps the lower portion of the gauge pin base 100 to the extension arm 86.

FIG. 25 illustrates a variety of pins of different diameter bases 110 to accommodate different sized holes. As apparent, many more sizes are available than shown.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A center point locator device for centering a center bushing boss on a plurality of differently shaped objects comprising:
   a bed plate, for providing a stationary platform, having slot apertures in the shape of a cross, said bed plate having a center bushing boss rigidly connected thereto;
   two sliding jaws, having right angle arms with slot apertures, and being traversely mirror coupled to the bottom of said bed plate, said right angle arms abutting, by means of axle pins through respective slot apertures of said bed plate; and
   two control handles, each having an elongated base, rigidly connected at the apex of each said sliding jaw through said slot apertures of said bed plate, wherein said elongated bases restrict said sliding jaws from rotating while said control handles traverse said sliding jaws within said bed plate, said right angle arms centering said center bushing boss of said bed plate, between said apexes of said sliding jaws.

2. The center point locator device as recited in claim 1, further comprising rotating jaws, rotatably connected to each of said sliding jaws, respectively.

3. The center point locator device as recited in claim 2, wherein said rotating jaws are provided with a rotating jaw attachment for changing the angle thereof.

4. The center point locator device as recited in claim 3, further comprising a spring attached to said center punch and to said center bushing boss.

5. The center point locator device as recited in claim 1, further comprising a center punch freely fitted in said center bushing boss.

6. The center point locator device as recited in claim 1, further comprising a resilient band connected to said control handles.

7. The center point locator device as recited in claim 1, further comprising a center punch bushing.

8. The center point locator device as recited in claim 7, wherein said center punch bushing is removable.

9. The center point locator device as recited in claim 1, further comprising a drill bit bushing.

10. The center point locator device as recited in claim 9, wherein said drill bit bushing is removable.

11. The center point locator device as recited in claim 10, wherein said removable drill bit bushing comprises varying diameter shaft holes.

12. The center point locator device as recited in claim 1, further comprising an extended bed plate arm with extended slot aperture.

13. The center point locator device as recited in claim 12, further comprising a gauge pin assembly disposed in said extended slot aperture in said bed plate.

14. The center point locator device as recited in claim 1, further comprising a removable extension arm.

15. The center point locator device as recited in claim 14, further comprising gauge pin assembly disposed in said removable extended arm.

16. A center point locator device for centering a center bushing boss on a plurality of differently shaped objects comprising:
   a bed plate, for providing a stationary platform, having slot apertures in the shape of a cross, said bed plate having a center bushing boss rigidly connected thereto;
   two sliding jaws, having right angle arms with slot apertures, and being traversely mirror coupled to the bottom of said bed plate; and at least one control handle, each having a base, rigidly connected at the apex of each said sliding jaw through said slot apertures of said bed plate, wherein said base restrict said sliding jaws from rotating while said control handles traverse said sliding jaws within said bed plate, said right angle arms centering said center bushing boss of said bed plate, between said apexes of said sliding jaws.

17. The center point locator device as recited in claim 16, further comprising rotating jaws, rotatably connected to each of said sliding jaws, respectively.

18. The center point locator device as recited in claim 17, wherein said rotating jaws are provided with rotating jaw attachments for changing the angular orientation thereof.

19. The center point locator device as recited in claim 16, further comprising a center punch freely fitted in said center bushing boss.

20. The center point locator device as recited in claim 16, further comprising a resilient band connected to said control handles.

21. The center point locator device as recited in claim 16, further comprising a drill bit bushing.

22. The center point locator device as recited in claim 16, further comprising one horizontal arm of said bed plate extended with an extended vertical slot in said extended arm.

* * * * *